United States Patent Office 3,409,597
Patented Nov. 5, 1968

3,409,597
POLYMETHYLENE PIPERIDYL POLY(ESTER-AMIDES)
Francis E. Cislak. Indianapolis, Ind., assignor to Reilly Tar & Chemical Corporation, Indianapolis, Ind., a corporation of Indiana
No Drawing. Filed May 17, 1965, Ser. No. 456,562
6 Claims. (Cl. 260—78)

ABSTRACT OF THE DISCLOSURE

Polymethylene piperidyl polyesteramides from a dicarboxylic acid and N-hydroxyalkyl piperidyl, piperidyl alkane which are useful as tire cord material.

---

This invention relates to new compositions of matter. More particularly, it relates to polymethylene piperidyl poly(ester-amides), which poly(ester-amides) have recurring in their molecular make-up the grouping:

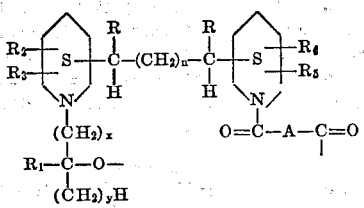

wherein R, $R_1$, $R_2$, $R_3$, $R_4$, and $R_5$ represent hydrogen or lower alkyl, they may be alike or they may be different; $x$ is a small integer from 0 to 4; $y$ is 0, 1, or 2; $n$ is a small integer from 0 to 4; and A represents an alkylene radical, an alkenylene radical (such, for example, as the maleic acid radical, the citraconic acid radical, the glutaconic acid radical, and the like) and an arylene radical (such, for example, as the phthalic acid radical, the isophthalic acid radical, the terephthalic acid radical, the naphthalic acid radical, the dinicotinic acid radical, the isocinchomeronic acid radical, and the like).

In general, my polymethylene piperidyl poly(ester-amides) may be prepared by heating an N-hydroxyalkylpiperidyl, piperidyl alkane with a di-carboxylic acid. I may also prepare my poly(ester-amides) by heating the N-hydroxyalkylpiperidyl, piperidyl alkanes with an ester of a dicarboxylic acid, such as the dimethyl ester. Or I may react the N-hydroxyalkylpiperidyl, piperidyl alkane with the di-acid chloride of the dicarboxylic acid and an alkali metal carbonate.

The N-hydroxyalkylpiperidyl, piperidyl alkanes which I use in the preparation of my polymethylene piperidyl poly(ester-amides) are new compounds. They are the subject of a co-pending U.S. Patent No. 3,375,255 issued Mar. 26, 1968. Ser No. 449,284 filed Apr. 19, 1965. They are prepared by the reaction of a chlorohydrin with an excess of a di-piperidyl alkane. They may also be prepared by the reaction of a chlorohydrin with an excess of a di-pyridyl alkane and then catalytically hydrogenating the resulting quaternary pyridinium salt. Some of them may be prepared by reacting an alkylene oxide with an excess of a di-piperidylalkane.

My poly(ester-amides) are characterized by the presence of a tertiary nitrogen in their molecular make-up. The presence of the tertiary nitrogen enables these poly(ester-amides) to be dyed quite readily with the ordinary acid dyes. Also, the presence of the tertiary nitrogen improves the adhesion of these poly(ester-amides) to fiber glass, thereby making them particularly useful in conjunction with glass fibers. And, these poly(ester-amides) are useful as tire-cord materials. They have the advantage of polyester tire cords and also the desirable strength of the polyamide (nylon) tire cords.

My poly(ester-amides) are useful in inhibiting corrosion in oil wells, oil refineries, in slushing oils, etc. The addition of about 100–1,000 p.p.m. of my poly(ester-amides) to oil well fluids inhibits corrosion.

The manner in which my invention may be carried out is illustrated by the following specific examples. It is to be understood that these examples are given by way of illustration only and are not to be construed as a limitation upon my invention.

Example 1.—Poly-(ester-amide) of adipic acid and 1-(4-piperidyl)-3-(4-N-beta-hydroxyethylpiperidyl)propane A mixture of 254 grams of 1-(4-piperidyl)-3-(4-N-beta-hydroxyethylpiperidyl)propane and 146 grams of adipic acid is placed into a high pressure stainless steel autoclave equipped with a stirrer and a means for controlled heating. The autoclave is alternately evacuated and flushed with nitrogen and finally evacuated and sealed. Then the temperature of the autoclave is raised to about 250° C. and the contents stirred. The stirring and heating are continued for about 2–3 hours. Then the vacuum on the autoclave is broken by admitting nitrogen gas. While maintaining an atmosphere of nitrogen in the autoclave, the heating is continued for about 1½ hours; the temperature being maintained at about 250° C. Now the autoclave is slowly evacuated, and the heating is continued at the 250° C. temperature for about another hour. Then the heating is discontinued, the vacuum again broken by the addition of nitrogen gas to the autoclave. When the autoclave has cooled to room temperature, the polymer formed is removed.

The polymer is characterized by having recurring in its molecular make-up the moiety.

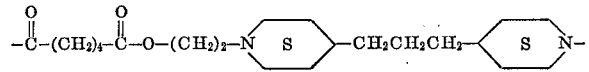

The polymer has a softening point of about 140° C. It is insoluble in water. It is soluble in hot methanol, pyridine, and dimethylformamide.

Example 2.—Poly-(ester-amide) of phthalic acid and 1-(4 - piperidyl) - 3 - (4 - beta - hydroxyethylpiperidyl) propane The procedure of Example 1 is repeated with the exception that 148 grams of phthalic anhydride is used in place of the 146 grams of adipic acid.

The resulting polymer is characterized by having recurring in its molecular make-up the moiety:

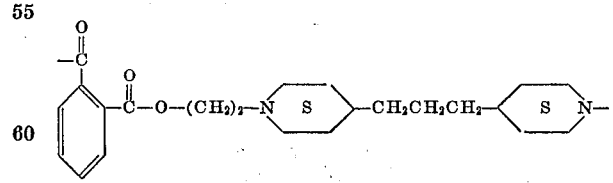

The softening point of the polymer is above about 150° C.

Example 3.—Poly(ester - amide) of terephthalic acid and 1 - (4 - piperidyl) - 3 - (4 - N - beta - hydroxyethylpiperidyl)propane The procedure of Example 1 is repeated with the exception that 194 grams of dimethyl terephthalic is used in place of the 146 grams of adipic acid.

The resulting polymer is characterized by having recurring in its molecular make-up the grouping:

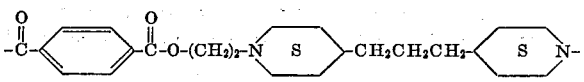

Example 4.—Poly - (ester - amide) of phthalic acid and 1 - (2 - piperidyl) - 3 - (4 - N - beta - hydroxyethylpiperidyl)propane The procedure of Example 1 is repeated with the exception that 254 grams of 1 - (2 - piperidyl) - 3 - (4 - N - beta - hydroxyethylpiperidyl)propane is used in place of the 1 - (4 - piperidyl) - 3 - (4 - N - beta - hydroxyethylpiperidyl)propane.

The resulting polymer is characterized by having recurring in its molecular make-up the moiety:

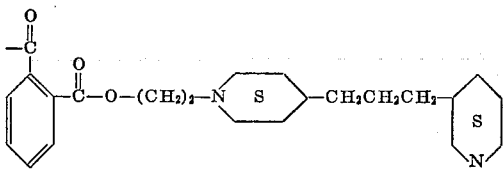

Example 5.—Poly - (ester - amide) of di - nicotinic acid and 1 - (4 - piperidyl) - 3 - (4 - N - beta - hydroxyethylpiperidyl)propane The procedure of Example 1 is repeated with the exception that 167 grams of di-nicotine acid (pyridine-3,5-dicarboxylic acid) is used in place of the 146 grams of adipic acid.

The resulting polymer is characterized by having recurring in its molecular make-up the moiety:

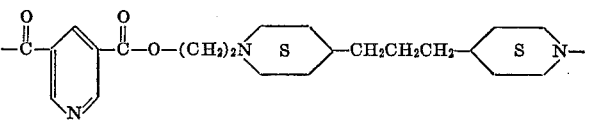

Example 6.—Poly - (ester - amide) of terephthalic acid and 1 - (2 - piperidyl) - 3 - (2 - N - beta - hydroxyethylpiperidyl)propane The procedure of Example 1 is repeated with the exception that 194 grams of dimethylterephthalate is used in place of the 146 grams of adipic acid and 1-(2-piperidyl) - 3 - ( 2 - N - beta - hydroxyethylpiperidyl)propane is used in place of the 1-(4-N-piperidyl) - 3 - (4-beta-hyddroxyethylpiperidyl)propane.

The resulting polymer is characterized by having recurring in its molecular make-up the moiety:

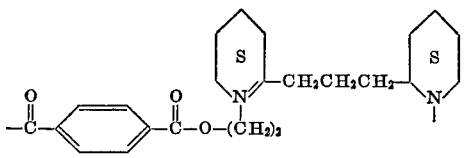

Example 7.—Poly - (ester - amide) of maleic acid and 1 - (4 - piperidyl) - 3 - (4 - N - beta - hydroxyethylpiperidyl)propane The procedure of Example 1 is repeated with the exception that 98 grams of maleic anhydride is used in place of the 146 grams of adipic acid.

The resulting polymer is characterized by having recurring in its molecular make-up the grouping:

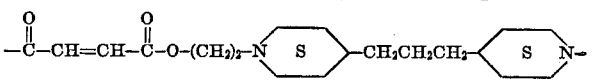

Example 8.—Poly - (ester - amide) of succinic acid and 1 - (4 - piperidyl) - 5 - (4 - N - beta - hydroxypropylpiperidyl)pentane The procedure of Example 1 is used with the exception that the reaction mixture consists of 118 grams of succinic acid and 296 grams of 1 - ( 4 - piperidyl) - 5 - (4 - N - beta - hydroxypropylpiperidyl)pentane.

The resulting polymer is characterized by having recurring in its molecular make-up the moiety:

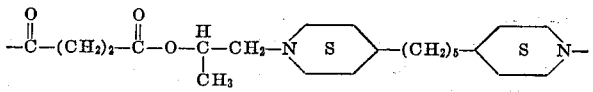

I claim as my invention:

1. Polymethylene piperidyl poly(ester - amides) consisting essentially of recurring units of the formula:

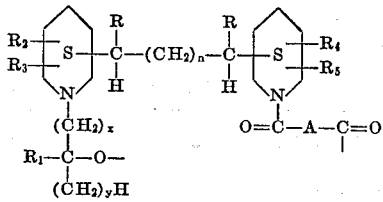

wherein R, $R_1$, $R_2$, $R_3$, $R_4$ and $R_5$ represent a member of the group consisting of hydrogen and lower alkyl; $x$ is a small integer from 0 to 4; $y$ is a small integer from 0 to 2; $n$ is a small integer from 0 to 4; and A represents a member of the class consisting of an alkylene radical, an alkenylene radical, and an arylene radical.

2. A poly(ester-amide) consisting essentially of recurring units of the formula:

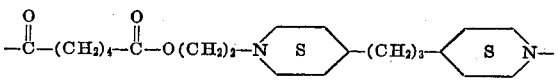

3. A poly(ester-amide) consisting essentially of recurring units of the formula:

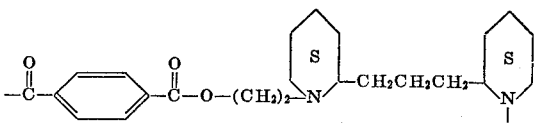

4. A poly(ester-amide) consisting essentially of recurring units of the formula:

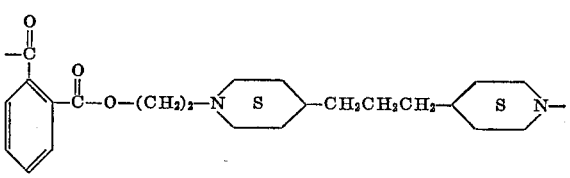

5. A poly(ester - amide) consisting essentially of recurring units of the formula:

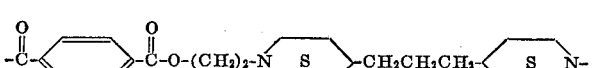

6. A poly(ester - amide) consisting essentially of recurring units of the formula:

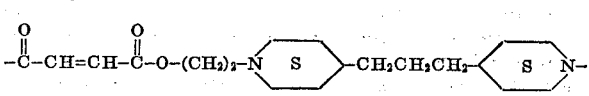

References Cited

UNITED STATES PATENTS 3,297,655  1/1967  Cislak _____ 260—78

WILLIAM H. SHORT, *Primary Examiner.*

H. D. ANDERSON, *Assistant Examiner.*